Aug. 1, 1933.  G. M. JENKINS  1,920,701
POTATO SORTER
Filed Dec. 15, 1930   5 Sheets-Sheet 1

Inventor
GEORGE M. JENKINS

Aug. 1, 1933.  G. M. JENKINS  1,920,701
POTATO SORTER
Filed Dec. 15, 1930  5 Sheets-Sheet 2
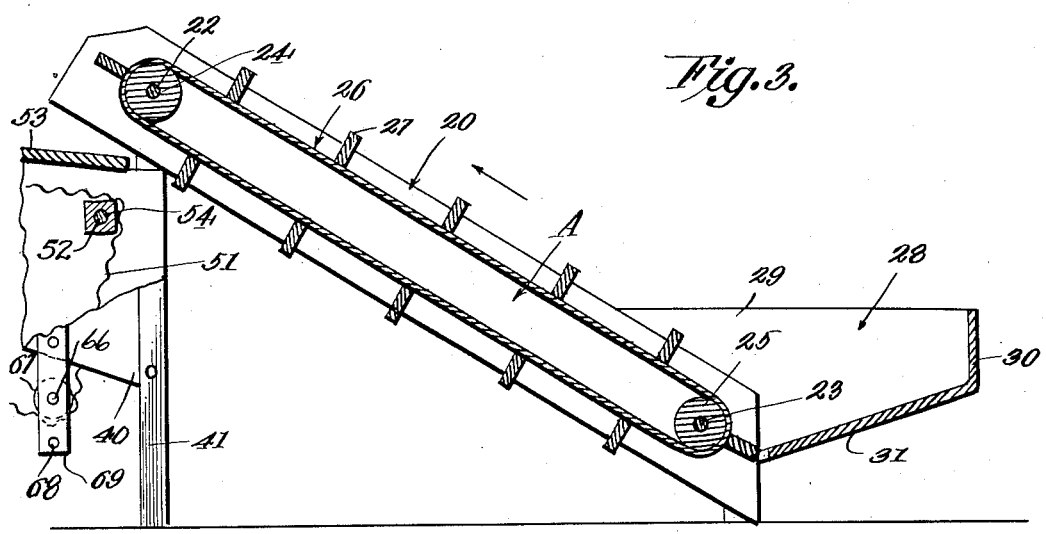
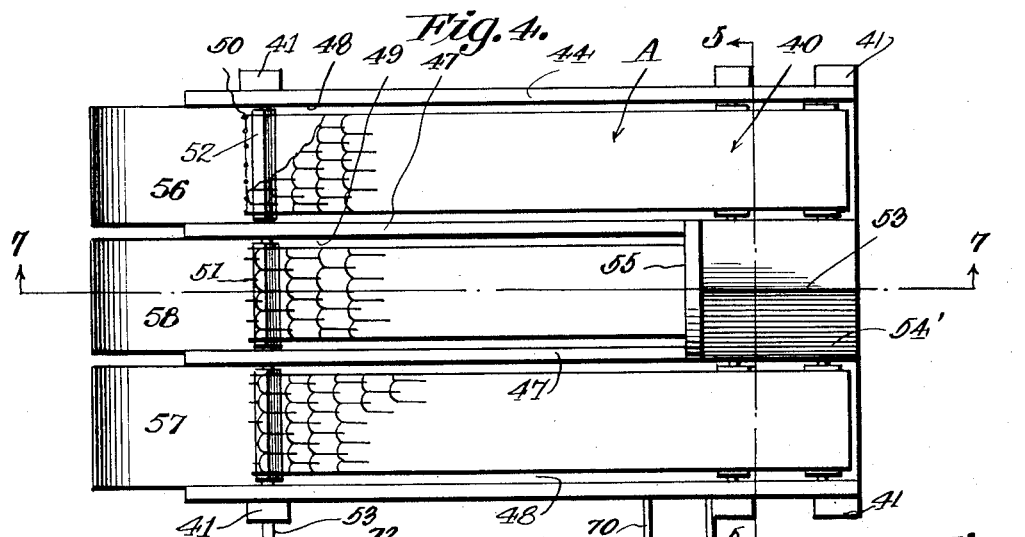
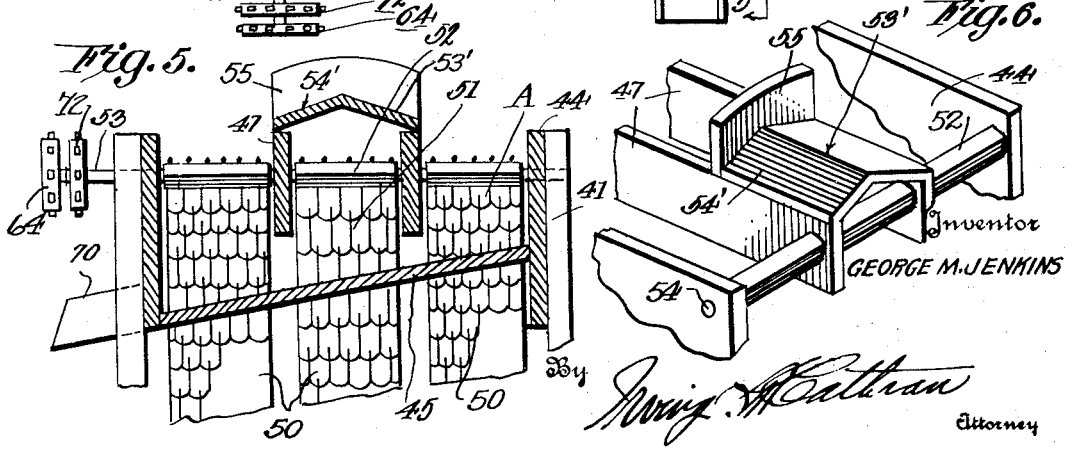
Inventor
GEORGE M. JENKINS

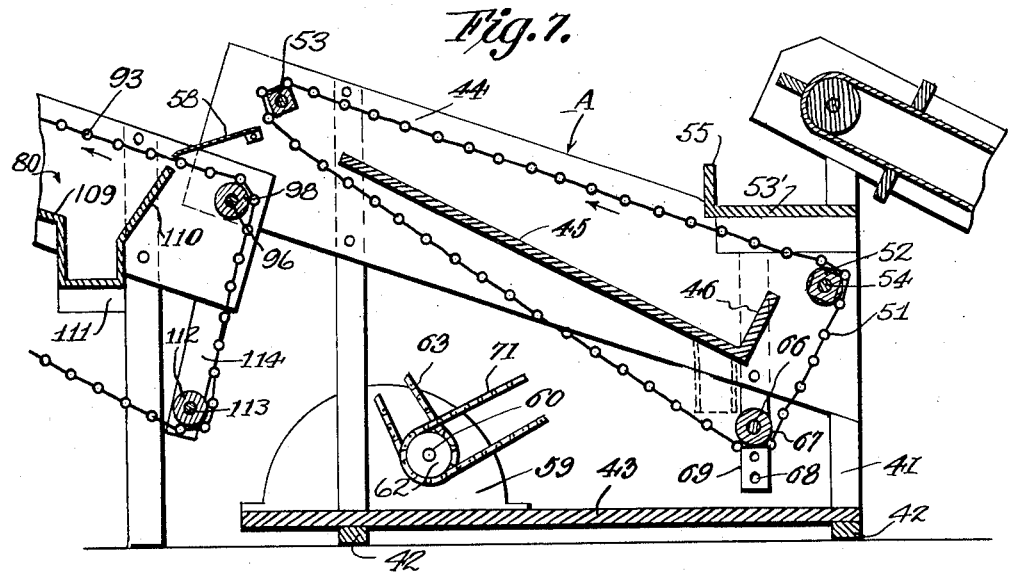
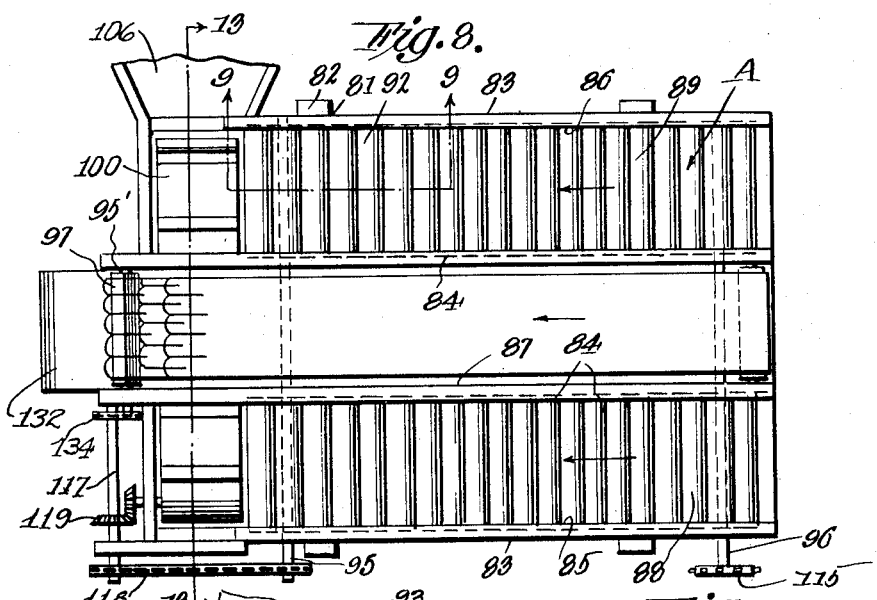
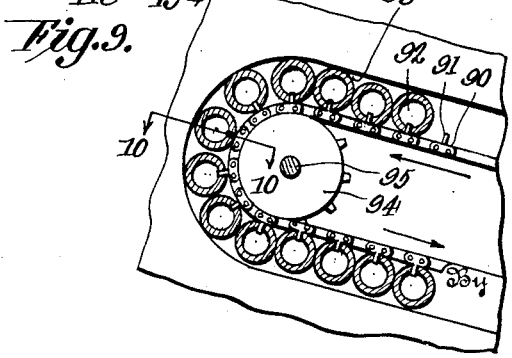
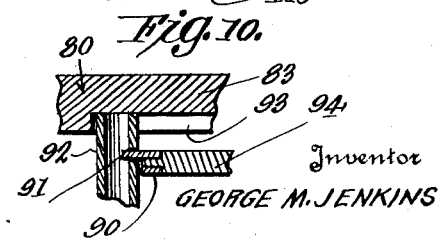

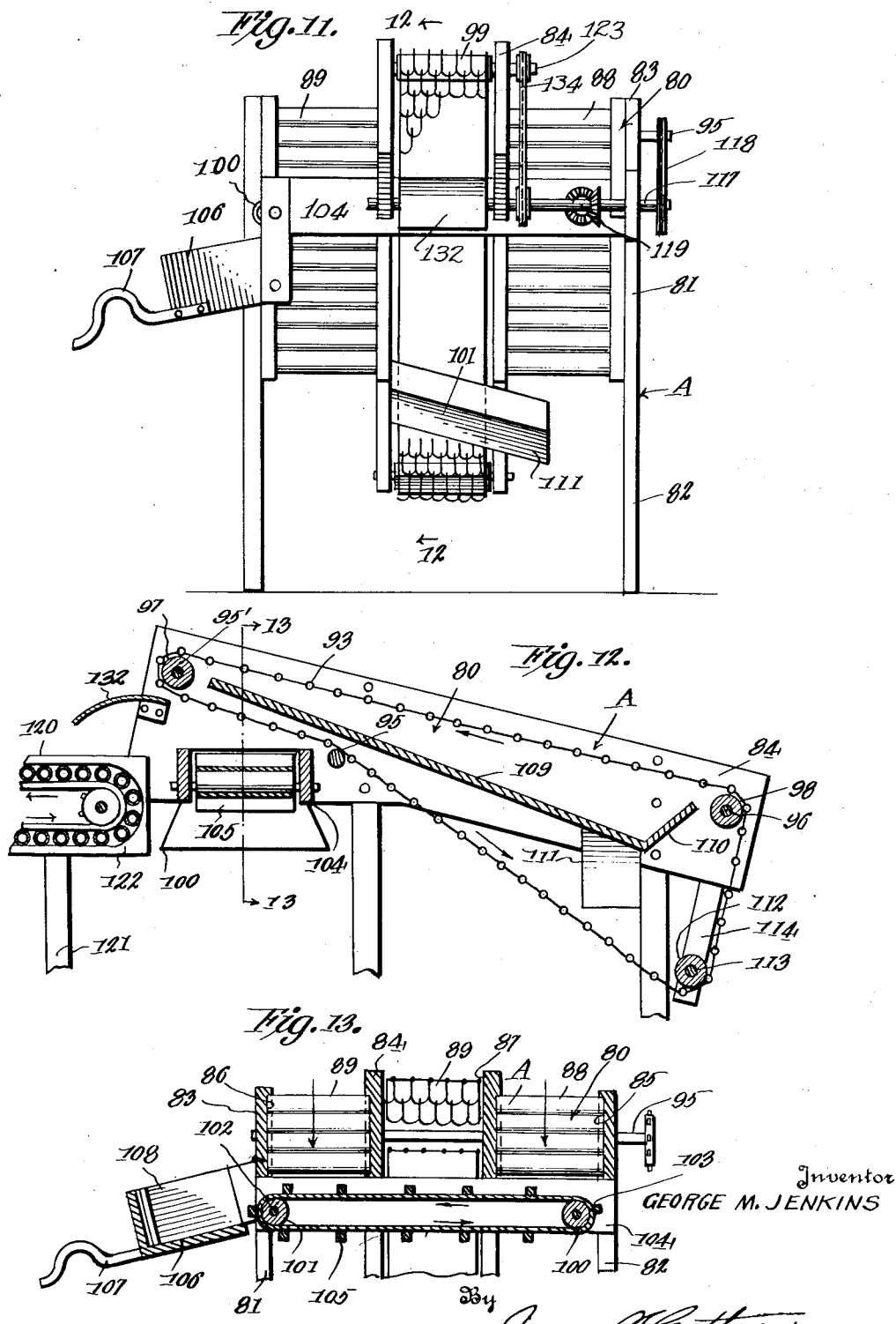

Aug. 1, 1933.  G. M. JENKINS  1,920,701
POTATO SORTER
Filed Dec. 15, 1930   5 Sheets-Sheet 5

Inventor
GEORGE M. JENKINS

By *[signature]*
Attorney

Patented Aug. 1, 1933

1,920,701

UNITED STATES PATENT OFFICE 1,920,701

POTATO SORTER

George M. Jenkins, Hemingford, Nebr.

Application December 15, 1930. Serial No. 502,564

5 Claims. (Cl. 209—71)

This invention appertains to a novel device for facilitating the grading and sorting of potatoes and has for its primary object the provision of means whereby a large quantity of potatoes can be conveniently and quickly handled with the employment of a minimum amount of labor.

In the raising of a crop of potatoes there is always a certain percentage of this crop that has to be discarded as of no value, and there is another varying percentage of potatoes which are not suitable for first class seed stock or first class table stock because of some defect that they may have such as scab, growth cracks, bruises, second growth, etc., and these potatoes must be sorted out from the number one potatoes and graded into a number two classification.

To my knowledge, no potato grader on the market to-day will perform more than the task of one operation, with the potatoes flowing over the grader and men working over the sides of the machine, picking out those potatoes which are not suitable for the number one grade. This means that all of those potatoes taken out, amounting to, in many instances, fifty per cent of the entire crop, are thrown around the grader and piled around in sacks in the way, and these potatoes necessitate a second handling. Usually cut potatoes, bruised potatoes, second growth and cracked potatoes and all other defective potatoes are then thrown out in one group and then after the number one potatoes have been graded out, these throwouts, as they are called, are again run over the grader and made up into as good a grade as can be made from this quality of potatoes, and in this second operation the potatoes are picked out which are of no value.

Handling the potatoes twice, as they have always been handled in the past, has made double work and expense besides slowing up the grading operation and keeping a lot of second grade potatoes on hand instead of getting them sacked and sorted immediately, ready to be shipped out.

It is therefore a prime object of my invention to provide a machine which will not only grade the number one potatoes properly, but which will also properly grade and size the number two potatoes, all in one operation, thereby avoiding a second handling.

In most northern states seed potatoes which are graded over an inch and one-half mesh grading chain are packed by the growers, and then the potatoes which will not grade number one seed are made into a number two grade of table stock. Table stock is sized over an inch and seven-eighths screen, ordinarily, sometimes an inch and three quarters, but never over an inch and one-half screen as such screen allows too many small potatoes to get into the table stock, thereby lowering the quality of such a table stock pack.

It is therefore another prime object of my invention to provide a machine which will not only make the two grades but to properly size the two grades for needed market conditions.

A further prime object of my invention is to provide a potato grading and sorting machine, in which all of the potatoes are initially dumped into the same hopper with a conveyor belt for carrying the potatoes from the hopper to a grading and sorting machine section, which section is provided with side and intermediate grader belts, the side grader belts or chains receiving the potatoes initially and being of the same mesh, namely one and one-half inches or number one stock, the potatoes being divided as the same are received from the conveyor and led onto the side grader belts, where the number two grade of potatoes are picked out by men standing along side of the machine and placed in the intermediate grading belt for proper grading.

A further prime object of my invention is the provision of a pair of side sorting roller belts for receiving the number one grade of potatoes from the two side grading belts where these potatoes can be further picked over by men standing along side of the machine, the picked potatoes being thrown into an intermediate grader belt which receives the number two grade potatoes from the intermediate grader belt of the first section, means being provided for receiving and sacking the potatoes from the sorting roller belts, and means being provided for leading the second grade potatoes over a sorting roller belt and then into the bagger.

A still further object of my invention is to provide an improved potato sorting and grading device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 3 is a longitudinal section through the first section of my machine embodying the hopper and elevating conveyor.

Figure 4 is a top plan view of the second section of my machine embodying the side number one grading belt and the intermediate number 2 grading belt.

Figure 5 is a transverse section through the same taken on the line 5—5 of Figure 4.

Figure 6 is a detail fragmentary perspective view of the front end of the section number two of my device illustrating the means for delivering the potatoes initially to the side number one grading chain belts, and for keeping the potatoes out of the intermediate number two grading belt.

Figure 7 is a longitudinal section through the second section of my device illustrating the arrangement thereof relative to the first and third sections of my device.

Figure 8 is a top plan view of the third section of my device illustrating the side sorting roller belts and the intermediate grading belt for the number 2 grade of potatoes.

Figure 9 is a detail section through one of the sorting roller belts taken on the line 9—9 of Figure 8 looking in the direction of the arrows.

Figure 10 is a detail section taken on the line 10—10 of Figure 9 looking in the direction of the arrows and illustrating the construction and arrangement of one sorting roller belt.

Figure 11 is an end elevation of the third section of my device.

Figure 12 is a longitudinal section through the third section of my improved device illustrating the arrangement thereof to the fourth section of my device.

Figure 13 is a transverse section taken on the line 13—13 of Figure 12 looking in the direction of the arrows.

Figure 1:
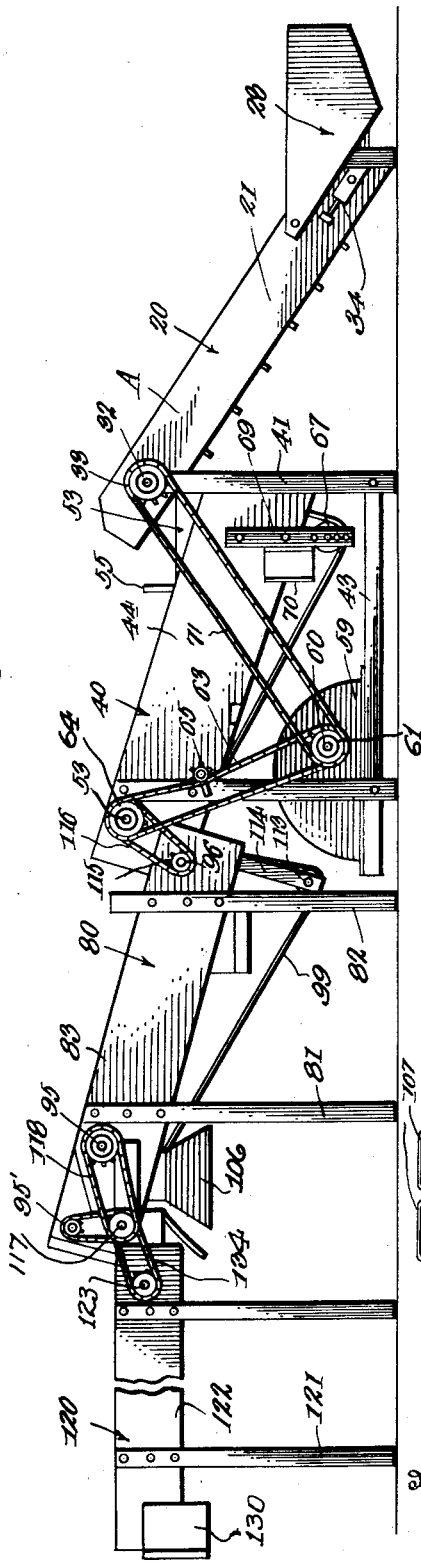
Figure 1 is a side elevation of my complete machine.

Referring to the drawings in detail, wherein similar reference characters designate corresponding parts throughout the several views, the letter A generally indicates my improved device, which comprises essentially four major sections, which are generally indicated by the reference characters 20, 40, 80, and 120, the first section being indicated by the reference character 20, the second section by the reference character 40, the third section by the reference character 80, and the fourth section by the reference character 120.

The second section 40 embodies one of the salient parts of my invention and the same includes a frame having upright supporting posts or standards 41, which can be braced and connected together in any desired way, such as by transverse strips 42, which connect the standards 41 together that are in transverse alignment. These transverse strips 42 also support a floor or base board 43, which further tends to brace the frame. The corner posts 41 which are in longitudinal alignment are connected together by side plates or boards 44, which incline downwardly toward the front of this section and these side boards support the transversely extending flat potato table or platform 45, which inclines downwardly toward the front of this section at a relatively great angle, the lower edge of the potato catching table or platform being provided with a bottom board 46, for a purpose, which will be later described.

Secured to the potato catching board or table 45 or secured in place in any other desired way, are a pair of intermediate spaced guide plates or boards 47, and the side plates or boards 44 and the intermediate spaced plates or boards 47 define side longitudinally extending channels 48 and an intermediate longitudinally extending channel 49.

The side channels 48 receive endless potato chain sorter belts 50 of the same character, and which are preferably of one and one-half inch mesh, while the intermediate channel 49 receives a potato grader chain belt 51 preferably of one and seven-eighths inch mesh. These potato grading chain belts 50 and 51 can be of the usual character now used in ordinary potato grading.

All of these belts are trained over rollers 52 at their opposite ends, which rollers can be of a polygonal shape in cross section and these rollers are keyed or otherwise secured to upper and lower transversely extending shafts 53 and 54 rotatably mounted in suitable bearings carried by the side boards or plates 44.

The forward ends of the intermediate plates or boards 47 are bridged by a potato dividing member 53', which member extends over the front end of the grading chain belt 51. It is to be noted that this potato dividing member 53' includes inclined side plates 54' and a front upright plate 55, so that potatoes fed onto the potato dividing member 53' will act as means for guiding the potatoes onto the forward ends of the side grading belts 50, and to prevent any of the potatoes from reaching the intermediate grading belt 51.

The section one of my device which is generally indicated by the reference character 20 constitutes the means for elevating and feeding the potatoes to the second section 40, and this elevating means comprises a frame including a pair of side boards or plates 21, which inclined downwardly and forwardly toward the front of the machine. These side plates or boards 21 are secured to the upper end of the front pair of corner standards 41, which standards project above the side boards 44 of the second section 40. The upper and lower ends of the side boards 21 of the first section 20 carries suitable bearings for rotatably supporting upper and lower shafts 22 and 23 to which are secured rollers 24 and 25 respectively. Trained around these rollers 24 and 25 is the endless conveyor belt 26, which is preferably of a flexible nature and which can be made of heavy canvas, rubber, or the like, and this endless conveyor belt is provided with spaced flights 27.

The forward end of the first section 20 supports a hopper 28, which can be secured to the side boards 21 in any desired way. It is to be noted that this hopper includes side walls 29, a front wall 30, and an inclined bottom wall 31, which leads toward the conveyor belt. This conveyor belt is of a width corresponding substantially to the width of the second section 40, and the potatoes to be graded and sorted are dumped into the hopper 28 and the conveyor belt 26 will ride through the hopper and effectively elevate and carry the potatoes to the second section 40.

The upper end of the first section extends over the second section 40 and thus the potatoes elevated by the conveyor belt will fall into the forward end of the second section, and a portion of the potatoes will fall directly on the side grading belts 50, while other potatoes will fall upon the potato dividing and distributing member 53', which distributing member will function to keep the potatoes from falling onto the central grading belt 51 and to throw the potatoes onto the side grader chain belts 50.

The upper ends of the side chain grader belts 50 and the intermediate chain grader belt 51 extends over chutes 56, 57 and 58.

The base board 43 supports any preferred type of prime mover 59, which can be in the nature of an electric motor if desired, and the drive shaft 60 thereof has keyed or otherwise secured thereto a pair of sprocket wheels 61 and 62, the sprocket wheel 61 has trained about the same a drive sprocket chain 63, which is in turn trained over a sprocket wheel 64 keyed or otherwise secured to the top shaft 53 of the second section 40. This provides means for operating the three grader belts 50 and 51, and if preferred, an idler 65 mounted on a suitable spring pressed stub shaft can be provided for engaging one run of the sprocket chain 63 so as to take up slack therein.

I also provide means for taking up slack in the two side grader chains 50 and the intermediate grader chain 51 and this means may comprise a transversely extending shaft 66 having keyed or otherwise secured thereto a roller 67, which engages the lower runs of all of the grading chain belts. The end of the shaft 66 can be selectively fitted in any one of a plurality of openings 68 formed in depending supporting brackets or side bars 69 secured to the side plates 44. By this arrangement the shaft 66 and its roller 67 can be raised or lowered to suit the belts.

It is obvious, from the description so far, that potatoes of a smaller size than the mesh of the grading belt will fall through the grading belt and drop onto the collecting table or platform 45, where the same will roll to the bottom thereof against the bottom board 46. This collecting table is also inclined laterally toward one side of the machine, as clearly shown in Figure 5 of the drawings, which forms substantially a trough at the lower end of the section 40, and this trough communicates with a delivery spout 70, which can be provided with means for receiving bags or the like.

Trained about the sprocket wheel 62 of the drive shaft 60 is a drive sprocket chain 71 and this chain is in turn trained about a sprocket wheel 33 keyed or otherwise secured to the top shaft 22 of the first section 20. The bottom shaft 23 can be provided with means 34 for permitting the adjusting thereof so as to take up slack in the conveyor belt 26. The top shaft 53 and the section 40 is provided with a second sprocket wheel 72 which provides means for driving the third section 80, which will now be described.

The third section 80 comprises a frame 81 constructed somewhat similar to the frame of the second section 40, and the frame 81 embodies uprights or standards 82, to which are secured downwardly and forwardly inclined side plates 83. Arranged in spaced relation to one another and spaced relation to the side plates 83 are intermediate side plates 84, which form in connection with the side plates 83 longitudinally extending channels 85 and 86 and 87. The side channels 85 and 86 are of the same character, and the channel 87 is arranged between the said side channels 85 and 86.

These intermediate side plates 84 can be secured to the frame in any desired way.

Arranged longitudinally within the side channels 85 and 86 are sorter belts 88 and 89 of the same character and each include a pair of spaced sprocket chains 90 having upstanding pins 91, which are fitted in sockets in tubular pipes or rollers 92, which extend across said chains 90. The ends of these rollers or tubular pipes 92 extend beyond the sides of the sprocket chains 90 and are received in endless channels 93, formed in the inner faces of the side plates 83 and the outer faces of the intermediate plates 84. This effectively holds the rollers 92 in proper position and these rollers form in connection with the chains 90 the endless sorter belts. The sprocket chains 90 of each sorter belt 88 and 89 are trained over pairs of upper and lower sprocket wheels 94, keyed or otherwise secured to upper and lower transversely extending shafts 95 and 96, which are journaled within the side plates 83 and the intermediate plates 84.

It is to be noted that the rollers 92 are in relative close proximity to one another so that none of the potatoes falling on the same will fall between the rollers.

Figure 2:
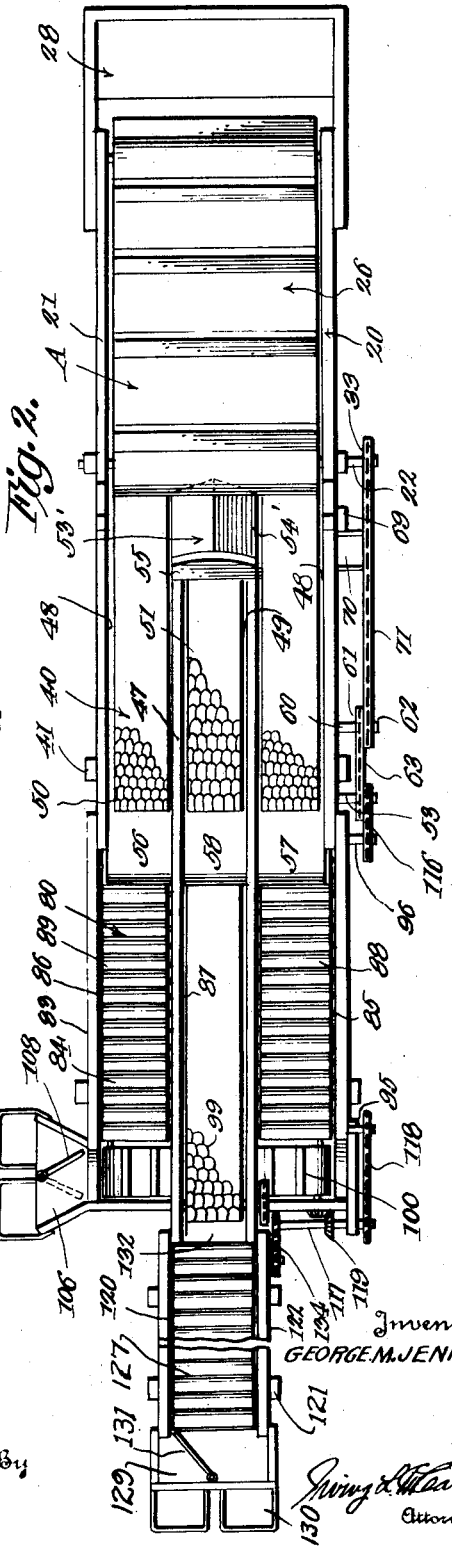
Figure 2 is a top plan view of the same.
Figure 14:
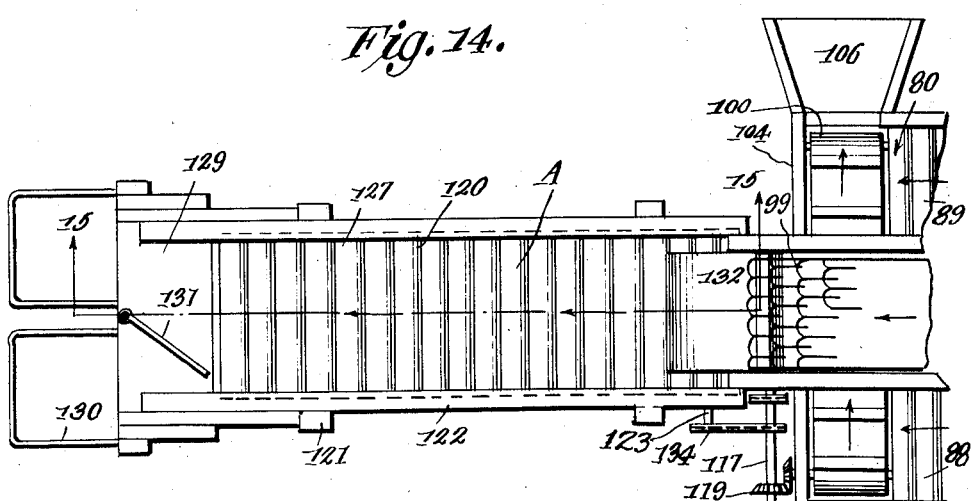
Figure 14 is a top plan view of the fourth section of my improved device showing the arrangement thereof relative to the third section.
Figure 15:
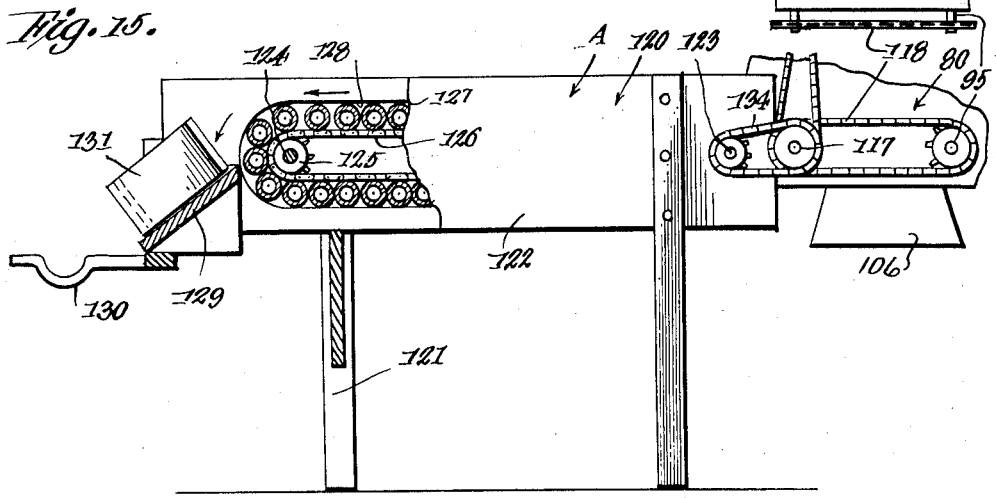
Figure 15 is a fragmentary longitudinal section taken on the line 15—15 of Figure 14.
Figure 16:
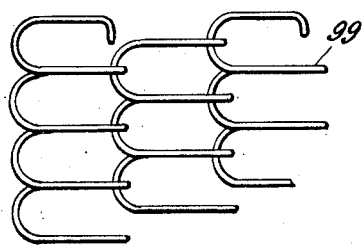
Figure 16 is a fragmentary top plan view illustrating the type of grader chain belt used in my device.
Figure 17:
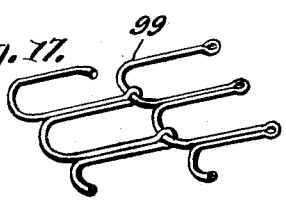
Figure 17 is a detail perspective view illustrating the type of grading chain belt used in my device.

The portions of the shafts 95' and 96 lying in the intermediate channel 87 has keyed or otherwise secured thereto upper and lower rollers 97 and 98, around which is trained an endless chain grader belt 99, which belt is of the same character as the intermediate belt 51 of the second section 40, namely of a one and seven-eighths inch mesh, and it is to be noted by referring to Figures 2 and 12 that the side sorter belts 88 and 89 receive potatoes from the side grader chain belts 50 of the second section 40, while the intermediate grader chain belt 99 of the third section 80 receives the potatoes from the intermediate grader chain belt 51 of the section 40.

The sorter belts 88 and 89 terminate short of the forward end of the frame, while the intermediate grader belt 99 extends to the end of the frame and beyond the side sorter belts 88 and 89 and delivers potatoes to the fourth section 120 which will be later described.

Extending transversely of the frame 81 and completely below the grader belt 99 is a conveyor belt 100, which conveyor belt is trained over end rollers 101, keyed or otherwise secured to end shafts 102 and 103, which are mounted in suitable bearings carried by frame boards 104 bolted or otherwise secured to the adjacent legs 82 of the frame 81, and this belt is provided with suitable flights 105 positioned directly at the ends of the sorter belts 88 and 89 and slightly below the same so as to receive the potatoes from the sorter belts 88 and 89.

The conveyor belt 100 functions to carry the potatoes from the sorter belts 88 and 89 to one side of the machine, where the same are received within a chute 106 which can incline downwardly as shown.

This chute 106 can carry any preferred means 107 for supporting bags to receive the potatoes and, if preferred, I can provide a pivoted guide plate 108 for directing the flow of potatoes into one bag or another.

Arranged between the intermediate boards or plates 84 is arranged a receiving or catching table 109 for the potatoes which may drop through the grader belt 99 and this catching table inclines downwardly toward the front end of section 80 and is provided with a bottom board 110. This bottom board 110 inclines laterally toward one side of the machine and terminates in a guide chute or trough 111, for leading the potatoes toward suitable bags or other receptacles.

In order to take up slack in the grader belt 99, I can provide an idler roller 112 which can be carried by a transverse shaft 113 supported by depending bars 114 rigidly connected to the intermediate plate 84.

The shaft 96 of the third section 80 can be provided with a sprocket wheel 115, which is in alignment with the sprocket wheel 72 of the shaft 53 of the second section 40. A suitable sprocket chain 116 is trained about these sprocket wheels 115 and 72. This provides the means for driving the side-sorter belts 88 and 89 and the intermediate grader belt 99.

In order to provide means for driving the transversely extending conveyor 100 I can provide a transversely extending shaft 117, which can be driven by a suitable sprocket 118, from the top shaft 95. One shaft 103 of the conveyor belt 100 can be driven from the shaft 117 by the use of suitable bevel gears 119.

The fourth section 120 is mounted at the end of the third section 80 and is so arranged as to receive the potatoes from the grader chain belt 99 of the said third section 80.

This fourth section 120 includes a frame having uprights or standards 121, the upper ends of which are bolted or otherwise secured to longitudinally extending side plates 122. The ends of the side plates 122 rotatably support shafts 123 and 124 to which are keyed or otherwise secured pairs of sprocket wheels 125. These pairs of spaced sprocket wheels 125 have trained over the same sprocket chains 126 which carry the tubular pipes or rollers 127, which are of the same character as the tubular pipes or rollers of the side sorter belts 88 or 89 of the third section 80. This forms a sorter belt in the fourth section and the ends of the tubular pipes or rollers 127 are received in endless channel ways 128 formed on the inner faces of the side plates 122 of the said fourth section.

The potatoes as they fall from this sorter belt of the fourth section are received in a chute 129 which support means for receiving suitable bags, the bag supporting means being indicated by the reference character 130.

I provide a swinging gate 131 in the chute 129 so as to direct the potatoes first toward one bag and then toward another.

It is to be noted that a guide chute 132 is carried by the third section 80 directly under the upper end of the grader belt 99 so as to insure the proper directing of the potatoes from the grader belt 99 onto the sorter belt of the fourth section.

The shaft 123 is driven from the shaft 117 of the third section 80 through the medium of a suitable sprocket chain 134.

In operation of my improved device, the potatoes are initially fed into the hopper 28 where the same are delivered by the conveyor belt 26 to the second section 40, as heretofore described, where the same are divided by the division member 53 onto the side grader chain belts 50. Men work along the side of the second section 40 and pick out potatoes in the two outer channels from the grading chain belts 50, which are not suitable for seed purposes, or for first class number one table stock purposes and toss these potatoes over the dividing or intermediate boards 47 onto the intermediate grading chain 51.

All of the potatoes from the three grading chain belts then flow from the second section 40 onto the third section 80, the potatoes flowing from the side grading belts 50 being delivered to the sorting belts 88 and 89, and the potatoes flowing from the intermediate grading belt 51 onto the intermediate grading belt 99. Naturally, the men working on the sides of the second section 40 do not pick out all of the imperfect potatoes and therefore men work on the opposite sides of the third section 80 also, and any potatoes which they find on the side roller sorter belts 88 and 89 not suitable for the first class grade are also tossed by these men into the center channel 87 on the intermediate grading chain belt 99, and these potatoes are properly sized by the inch and seven-eighths mesh chain, it being seen that these second grade potatoes are graded both by the intermediate belts 51 and 99 and the second section 40 and the third section 80. It is to be also noted that the first grade potatoes are effectively graded, while the same are being handled by side grading chains 50 of the said second section 40.

The rubberized canvas conveyor 100 of the third section 80 receives all of the potatoes eventually from the side grading chain belts 50 of the second section 40 and from the sorting chain belts 88 and 89 of the third section 80. This cross conveyor 100 conveys the potatoes to one side of the machine to the sacks, as heretofore described.

The second grade potatoes in the center channel 87 traveling on the intermediate grader chain belt 99 of the third section are carried over the cross conveyor 100 and poured onto the fourth section 120 onto the roller supporting sorter belt of this section. There men work and pick off from the rollers any potatoes which are too inferior for a number two grade and after the potatoes have gone over the rollers into section four, they drop into the potato sacks at the end of said section.

From the foregoing description, it can be seen that I have provided a potato grader which will, in a single operation, properly grade the number one potatoes and also properly grade the number two potatoes, and at the same time permitting the inferior potatoes to be picked therefrom.

Changes in details may be made without departing from the spirit or the scope of this invention, but:—

What I claim as new is:

1. In a potato grading and sorting machine, a frame, side and intermediate endless grading belts extending longitudinally of the frame, the side belts being of the same mesh, means for initially delivering potates to the side grading belts, said side grading belts also constituting picking tables, means for receiving the potates from the side and intermediate belts comprising side roller picking and sorting belts and an intermediate grading belt of the same mesh as the first intermediate grading belt, and guide members extending from all of the first grading belts for delivering the potatoes from the side grading belts to the roller supporting and picking roller belts and the potatoes from the first intermediate grading belt to the second grading intermediate belt.

2. In a potato grading and sorting machine, a frame, side and intermediate endless grading belts extending longitudinally of the frame, the side belts being of the same mesh, means for initially delivering potatoes to the side grading belts, said side grading belts also constituting picking tables, means for receiving the potatoes from the side and intermediate belts comprising side roller picking and sorting belts and an intermediate grading belt of the same mesh as the first intermediate grading belt, guide members extending from all of the first grading belts for delivering the potatoes from the side grading belts to the roller supporting and picking roller belts and the potatoes from the first intermediate grading belt to the second grading intermediate belt, and an endless roller picking and sorting belt for receiving the potatoes from the second intermediate grading belt.

3. In a potato grading and sorting machine, a frame, side and intermediate endless grading belts extending longitudinally of the frame, the side belts being of the same mesh, means for initially delivering potatoes to the side grading belts, said side grading belts also constituting picking tables, means for receiving the potatoes from the side and intermediate belts comprising side roller picking and sorting belts and an intermediate grading belt of the same mesh as the first intermediate grading belt, guide members extending from all of the first grading belts for delivering the potatoes from the side grading belts to the roller supporting and picking roller belts and the potatoes from the first intermediate grading belt to the second intermediate grading belt, an endless roller picking and sorting belt for receiving the potatoes from the second intermediate grading belt, and a potato bagger carried by the last mentioned roller picking and sorting belt.

4. In a potato grading and sorting machine, a frame, side and intermediate endless grading belts extending longitudinally of the frame, the side belts being of the same mesh, means for initially delivering potatoes to the side grading belts comprising side roller picking and sorting belts and an intermediate grading belt of the same mesh as the first intermediate grading belt, guide members extending from all of the first grading belts for delivering the potatoes from the side grading belts to the roller supporting and picking roller belts and the potatoes from the first intermediate grading belt to the second intermediate grading belt, an endless roller picking and sorting belt for receiving the potatoes from the second intermediate grading belt, a potato bagger carried by the last mentioned roller picking and sorting belt, and a cross endless conveyor for receiving the potatoes from the side roller picking and sorting tables, and a bagger for receiving the potatoes from said cross endless conveyor belt.

5. In a potato picking and sorting machine, a frame, side and intermediate grading belts extending longitudinally of the frame, means for initially delivering potatoes to the side grader belts, said side grader belts being of the same mesh and also constituting picking and sorting tables, means for receiving the potatoes from the grading belts including side endless roller picking and sorting tables, and an endless grading belt of the same mesh as the first intermediate grading belt, means for delivering the potatoes from the side grading belts to the roller picking and sorting belts, means for delivering the potatoes from the first intermediate grading belt to the second grading belt, an endless cross conveyor receiving the potatoes from the roller picking and sorting belts.

GEORGE M. JENKINS.